May 17, 1966
N. B. JONES
3,251,519
ROOF RACK FOR A TRUCK
Filed April 30, 1965
2 Sheets-Sheet 1
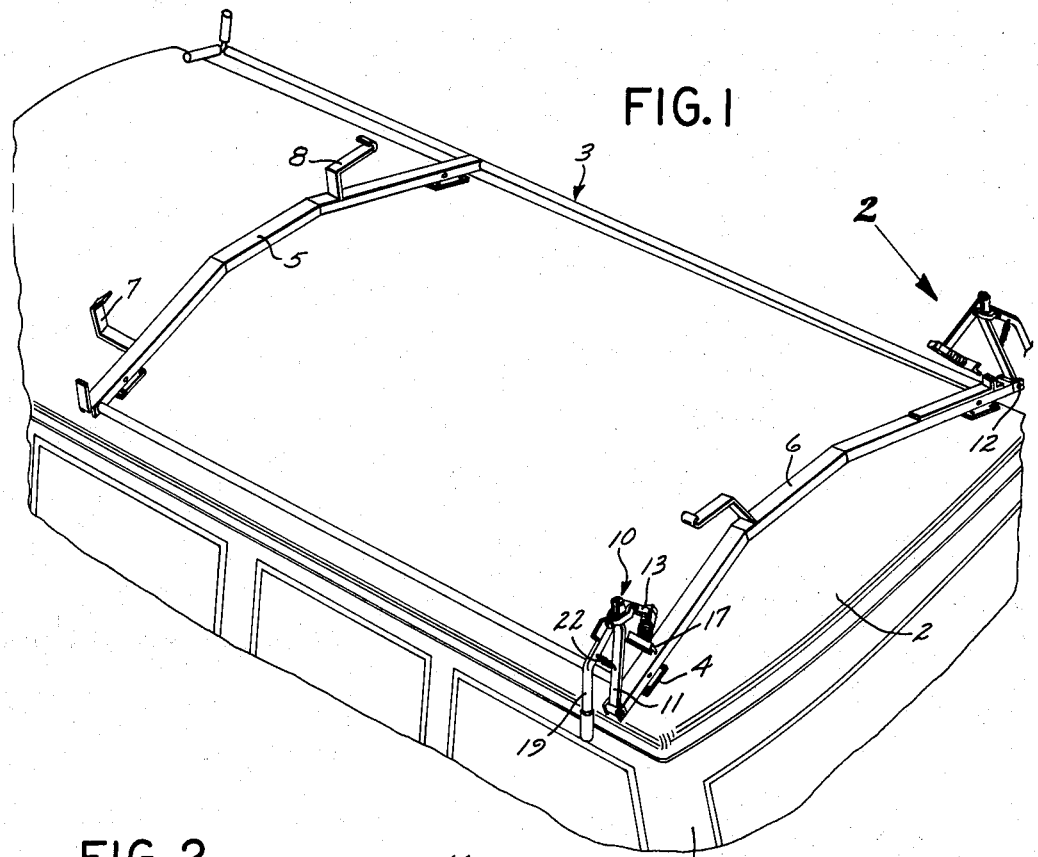
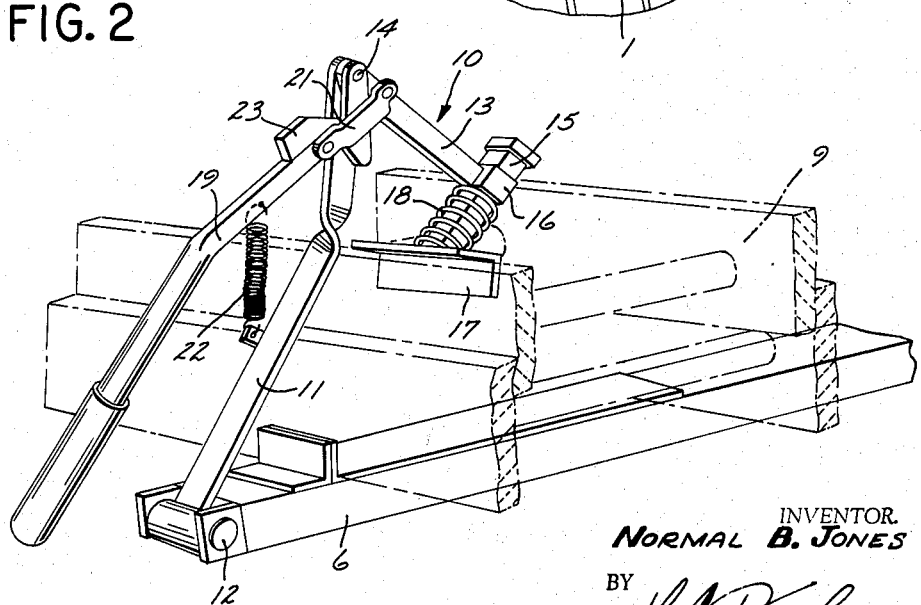
INVENTOR.
NORMAL B. JONES
BY
ATTORNEY

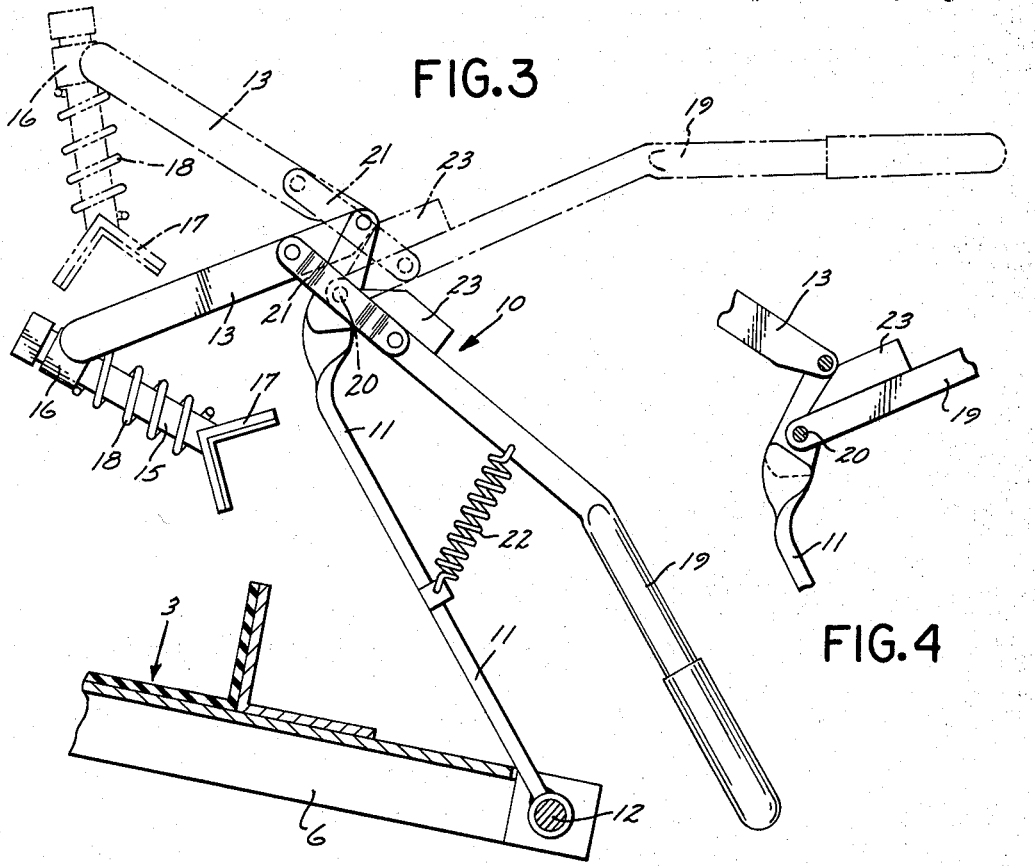
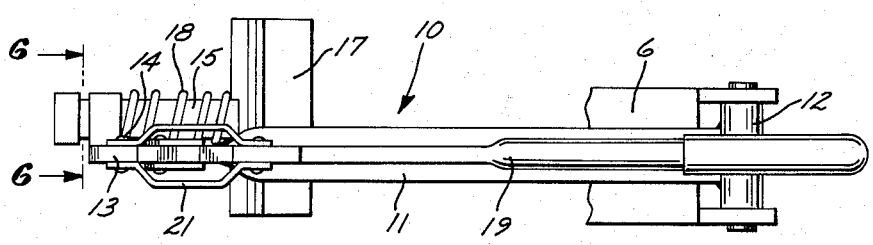
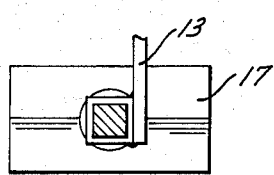

United States Patent Office 3,251,519
Patented May 17, 1966

3,251,519
ROOF RACK FOR A TRUCK
Normal B. Jones, 8277 Los Altos Drive,
Buena Park, Calif.
Filed Apr. 30, 1965, Ser. No. 452,162
5 Claims. (Cl. 224—42.1)

This invention relates to a roof rack for a truck whereby certain relatively flat objects, such as stepladders or flat sheet material, may be effectively held on the roof of a truck to prevent these objects from falling off during the normal movement of the truck.

An object of my invention is to provide a novel clamp or hold down means on the roof rack, which will effectively hold one end of the ladder or flat material and still permit the clamp to be easily and quickly released, so that the ladder or other object can be removed from the truck roof.

Still another object is to provide a novel clamp for a roof rack of the character stated which can be manipulated by one hand to either clamp or release the ladder or the like.

Another object of my invention is to provide a novel clamp for a roof rack which is spring pressed in the clamping position to effectively engage the ladder or the like, and which springs also assist in releasing the clamp when manipulated by the operator.

Other objects, advantages and features of invention may appear from the accompanying drawings, the subjoined detailed description and the appended claims.

In the drawing:

FIGURE 1 is a perspective view of a truck roof with a rack and my clamp mounted thereon.

FIGURE 2 is a perspective view of my clamp for a roof rack.

FIGURE 3 is a side elevation of my clamp with parts in section.

FIGURE 4 is a side elevation of the toggle joint in one position of the parts.

FIGURE 5 is a top plan view of my rack clamp.

FIGURE 6 is a sectional view taken on line 6—6 of FIGURE 5.

Referring more particularly to the drawing, the numeral 1 indicates an automobile truck which includes a solid top 2. A rectangular frame 3 is fixedly attached to the top 2 of the truck by means of four metal pads 4 which are fixedly secured to the top 2 of the truck. The frame 3 consists of end pieces 5 and 6 formed of structural steel parts, and the part 5 is formed with fixed metal stops 7 and 8, against which the ladder 9 or the like rests. This holds one end of the ladder in position while the other end is securely clamped in position by my roof clamp 10.

The clamp 10 consists of an arm 11 which is pivotally secured to the outer ends of the member 6 by means of the pivot pin 12. The mounting arm 11 can thus rotate in an arc about the pin 12 to either engage the ladder 9 or to disengage the ladder, and then swing outwardly so that the ladder can be removed from the roof of the truck. A link 13 is pivotally attached to the upper end of the mounting arm 11, as shown at 14. A post 15 is slidably mounted in the outer end of the link 13 in a box 16, and this post has a V-shaped rest 17 fixedly attached to the outer end thereof. The rest 17 has a plastic or rubber surface on the inner side thereof to engage the ladder 9 and to more effectively hold that ladder. A coil spring 18 surrounds the post 15 and one end of the spring bears against the rest 17 and the other end against the box 16, so that the spring when compressed will yieldably urge the rest 17 against the ladder to more effectively hold that ladder against slippage.

The link 13 is swung downwardly to compress the spring 18 and urge the rest 17 against the ladder 9 by means of a handle 19. The handle 19 is pivotally secured to the arm 11 adjacent the upper end of this arm, as shown at 20. The upper end of the handle 19 is also pivotally attached to the link 13 by means of a pair of straps 21 which project from the handle 19, and are then pivotally secured to the link 13 at a point spaced from the pivot pin 14. When the handle 19 is swung upwardly, the straps 21 will also swing the links 13 and the post 15 upwardly to disengage the rest 17 from engagement with the ladder 9. A coil spring 22 is attached to the handle 19 at one end and the arm 11 at the other end, and this coil spring tends to urge the handle 19 into a lowered position where the rest 17 is engaging the ladder. A stop 23 on the top of the handle 19 will limit the upward swing of the handle, since the stop will engage the upper end of the arm 11.

The rack clamp 3 is shown in ladder engaging position in FIGURES 1 and 2 and with the rest 17 bearing against one leg of the ladder 9, thus securely clamping one end of the ladder to hold it in position on the roof 2 of the truck. When it is desired to remove the ladder 9, the handle 19 is manually swung upwardly against the tension of the spring 22, and this also swings the link 13 upwardly and thus move the rest 17 away from the leg of the ladder. The entire clamp assembly can then be rotated around the mounting pin 12 so that the clamp assembly will hang substantially in a vertical position. The ladder can now be removed. When it is replaced the clamp parts are swung into the position shown in dotted lines in FIGURE 3, and the workman then swings the handle 19 downwardly to the position shown in solid lines in FIGURE 3, whereupon the rest 17 is pressed against one leg of the ladder 9 to hold that ladder securely in position.

Having described my invention, I claim:

1. In a roof rack for a truck comprising a rectangular frame fixedly secured to the outside of the roof of a truck, said rack including a transversely extending end piece,
   a clamp comprising an arm,
   means pivotally securing said arm to said end piece,
   a link pivotally mounted on said arm,
   a rest engageable with an object on the roof of a truck,
   means mounting the rest on said link,
   a handle pivotally mounted on said arm,
   and a strap pivotally attached to both the handle and the link.

2. In a roof rack for a truck comprising a rectangular frame fixedly secured to the outside of the roof of a truck, said rack including a transversely extending end piece,
   a clamp comprising an arm,
   means pivotally securing said arm to said end piece,
   a link pivotally mounted on said arm,
   a rest engageable with an object on the roof of a truck,
   means mounting the rest on said link,
   a handle pivotally mounted on said arm,
   a strap pivotally attached to both the handle and the link,
   and a spring extending between and attached to both the handle and said arm, 3. In a roof rack for a truck comprising a rectangular frame fixedly secured to the outside of the roof of a truck, said rack including a transversely extending end piece,
   a clamp comprising an arm,
   means pivotally securing said arm to said end piece,
   a link pivotally mounted on said arm,
   a rest engageable with and adapted to press against an object on the roof of the truck, a post rising from said rest, means slidably mounting said post on the link,
a coil spring extending between said rest and said link and engaging both the rest and the link,
a handle pivotally mounted on said arm,
and a strap pivotally attached to both the handle and the link.

4. In a roof rack for a truck comprising a rectangular frame fixedly secured to the outside of the roof of a truck, said rack including a transversely extending end piece,
a clamp comprising an arm,
means pivotally securing said arm to said end piece,
a link pivotally mounted on said arm,
a rest engageable with and adapted to press against an object on the roof of the truck, a post rising from said rest,
means slidably mounting said post on the link,
a coil spring extending between said rest and said link and engaging both the rest and the link,
a handle pivotally mounted on said arm,
a strap pivotally attached to both the handle and the link,
and a spring extending bebtween and attached to both the handle and said arm.

5. In a roof rack for a truck comprising a rectangular frame fixedly secured to the outside of the roof of a truck, said rack including a transversely extending end piece,
a clamp comprising an arm,
means pivotally securing said arm to said end piece,
a link pivotally mounted on said arm,
a V-shaped rest engageable with an object on the roof of a truck,
a post rising from said rest and slidably mounted on said link,
a coil spring surrounding the post and extending between the rest and the link,
a handle pivotally mounted on the arm at the upper end of the arm,
a strap pivotally attached to both the handle and the link,
a stop lug on the handle engageable with said arm in one position of the parts,
and a coil spring extending between and attached to both the handle and the arm.

References Cited by the Examiner
UNITED STATES PATENTS

| | | | |
|---|---|---|---|
| 2,134,823 | 11/1938 | Herrmann et al. | 248—361 |
| 3,030,062 | 4/1962 | Chevalier | 248—361 |

FOREIGN PATENTS

| | | |
|---|---|---|
| 1,290,264 | 3/1962 | France. |

References Cited by the Applicant
UNITED STATES PATENTS

| | | |
|---|---|---|
| 2,115,242 | 4/1938 | Wagner et al. |
| 2,840,288 | 6/1958 | Broddon. |
| 2,915,276 | 12/1959 | Lindmark. |
| 2,962,250 | 11/1960 | Carey et al. |
| 3,164,395 | 1/1965 | Burch et al. |

GERALD M. FORLENZA, *Primary Examiner.*

F. WERNER, *Assistant Examiner.*